(12) United States Patent
Hamilton, II et al.

(10) Patent No.: US 8,032,523 B2
(45) Date of Patent: Oct. 4, 2011

(54) METHOD AND SYSTEM FOR DATA MIGRATION

(75) Inventors: Rick A. Hamilton, II, Charlottesville, VA (US); Jenny S. Li, Danbury, CT (US); Vivek Salve, Poughkeepsie, NY (US); Anne R. Sand, Peyton, CO (US); Elisabeth R. Stahl, Shaker Heights, OH (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/117,330

(22) Filed: May 8, 2008

(65) Prior Publication Data

US 2009/0282273 A1    Nov. 12, 2009

(51) Int. Cl.
*G06F 17/00*    (2006.01)
(52) U.S. Cl. ........................................ 707/720; 707/809
(58) Field of Classification Search .................. 707/720, 707/809
See application file for complete search history.

(56) References Cited

U.S. PATENT DOCUMENTS

| | | | |
|---|---|---|---|
| 5,313,631 A | 5/1994 | Kao | |
| 6,732,241 B2 | 5/2004 | Riedel | |
| 6,775,673 B2 | 8/2004 | Mahalingam et al. | |
| 6,789,115 B1 | 9/2004 | Singer et al. | |
| 6,915,287 B1 | 7/2005 | Felsted et al. | |
| 2002/0107871 A1 | 8/2002 | Wyzga et al. | |
| 2003/0051104 A1* | 3/2003 | Riedel | 711/154 |
| 2003/0158847 A1 | 8/2003 | Wissner et al. | |
| 2003/0177150 A1 | 9/2003 | Fung et al. | |
| 2005/0055590 A1* | 3/2005 | Farkas et al. | 713/320 |
| 2005/0060107 A1* | 3/2005 | Rodenberg et al. | 702/62 |
| 2005/0125463 A1 | 6/2005 | Joshi et al. | |
| 2005/0251802 A1 | 11/2005 | Bozek et al. | |
| 2005/0268121 A1 | 12/2005 | Rothman et al. | |
| 2005/0273726 A1 | 12/2005 | Wyzga et al. | |
| 2006/0080371 A1 | 4/2006 | Wong et al. | |
| 2006/0167883 A1 | 7/2006 | Boukobza | |
| 2006/0212495 A1* | 9/2006 | Tokunaga et al. | 707/204 |
| 2007/0011209 A1 | 1/2007 | Wietlisbach et al. | |
| 2007/0130234 A1 | 6/2007 | Ikegaya et al. | |
| 2007/0136392 A1 | 6/2007 | Oh et al. | |
| 2007/0150488 A1 | 6/2007 | Barsness et al. | |

FOREIGN PATENT DOCUMENTS

EP    1 215 590 A2    6/2002

OTHER PUBLICATIONS

Brian Garnett, Building Power Efficient Solutions With Cisco MDS 9000 Directors, Dec. 2006, pp. 1-12.

* cited by examiner

*Primary Examiner* — Mohammad Ali
*Assistant Examiner* — John P Hocker
(74) *Attorney, Agent, or Firm* — George R. McGuire; Blaine T. Bettinger; Bond Schoeneck & King

(57) ABSTRACT

A method and system for migrating source data from one or more databases to a destination database, wherein the destination database is selected based on power consumption of the destination database. A data migration server determines which destination database should be selected by selecting a number of candidates and comparing the power consumed, the available space and the maximum monthly power consumption limit. A user intervention policy is created to evaluate which data should be moved to a destination database. A "payback period" is calculated to determine the amount of time that will elapse before savings are realized.

17 Claims, 2 Drawing Sheets

METHOD AND SYSTEM FOR DATA MIGRATION

BACKGROUND OF THE INVENTION

The present invention relates generally to energy efficiency across the data center, and more particularly to the migration of data based on power consumption.

Energy efficiency across the entire data center is becoming a top concern for corporations around the world. This problem requires consideration of all energy efficiency components of the data center, from component levels through server and system levels, and concluding with the complete data center. At the system level, storage devices are an extremely important part of the equation, which needs to be analyzed. Disk systems can require substantial amounts of power to operate and cool, and in many cases, can require more power than the server itself.

Data migration is the process of transferring data between storage types, formats or computer systems. Data migration is usually performed programmatically to achieve an automated migration, freeing up human resources from tedious tasks. It is required when organizations or individuals change computer systems or upgrade to new systems, or when systems merge (such as when the organizations that use them undergo a merger/takeover).

To achieve an effective data migration procedure, data on the old system is mapped to the new system providing a design for data extraction and data loading. The design relates old data formats to the new system's formats and requirements. Programmatic data migration may involve many phases but it minimally includes data extraction where data is read from the old system and data loading where data is written to the new system.

After loading into the new system, results are subjected to data verification to determine that data was accurately translated, is complete, and supports processes in the new system. During verification, there may be a need for a parallel run of both systems to identify areas of disparity and forestall erroneous data loss. Automated and manual data cleansing is commonly performed in migration to improve data quality, eliminate redundant or obsolete information, and match the requirements of the new system. Data migration phases (design, extraction, cleansing, load, verification) for applications of moderate to high complexity are commonly repeated several times before the new system is activated.

Traditional data migration involves business decisions from application owners and IT administrators to predefine a destination database that usually resides physically on another disk for each given source database. Very often, such migration is a one to one relationship where a source database is mapped to a predefined destination database This migration process is done at a database level that involves no concerns on how data is being used by applications and how it relates to power consumption.

Reference is made to FIG. 1, which illustrates a traditional database migration process 10. Database A at 12 and Database B at 14 are source databases containing data that can be migrated to another storage database. Migration routines, cleansing routines and indexing strategies are created by application owners. IT administrators then determine the physical location of the destination database. The source data from Database A is moved to Staging Cleansing scripts are applied to the data on Staging Database A and to the data on Staging Database B. An index is then created for the data on Staging Database A and for the data on Staging Database B. Each set of data from Staging Database A and Staging Database B is migrated to a destination database 20, which is Database 1 in the Figure. The data from Staging Database A and Staging Database B must be merged with each other and with any existing data on Database 1. In these prior art methods, the destination database is predefined for each source database, not taking into account the amount of power that may used in the destination database.

It is a primary object of the invention to provide a method and system for migrating data based on power conservation. It is another object of the invention to provide a method and system for selecting the destination database based on energy efficiency. It is a further object of the invention to provide a method and system for determining the length of time for realizing cost savings after migration of data has been performed.

SUMMARY OF THE INVENTION

These and other objects and advantages are accomplished by a method for migrating source data from one or more databases to a destination database, wherein the destination database is selected based on power consumption of the destination database. Specifically, the method of the present invention determines which destination database should be selected by selecting a number of candidates and comparing the power consumed, the available space and the maximum monthly power consumption limit. In one aspect of the method of the invention, a user intervention policy is created to evaluate which data should be moved to a destination database that is more energy efficient than the source database. In another aspect of the method of the invention, a "payback period" is calculated to determine the amount of time that will elapse before savings are realized.

In accordance with another embodiment, a system is provided for migrating source data from one or more databases to a destination database, wherein the destination database is selected based on power consumption of the destination database. Specifically, the system of the present invention determines which destination database should be selected by selecting a number of candidates and comparing the power consumed, the available space and the maximum monthly power consumption limit. In one aspect of the system of the invention, the system includes a data migration server to control the decision process and manage the data migration based on energy efficiency characteristics. In another aspect of the system of the invention, the data migration server handles the mapping of the data. In yet another aspect of the invention, the data migration server maintains the user intervention policy table, which is critical to the destination database decision.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
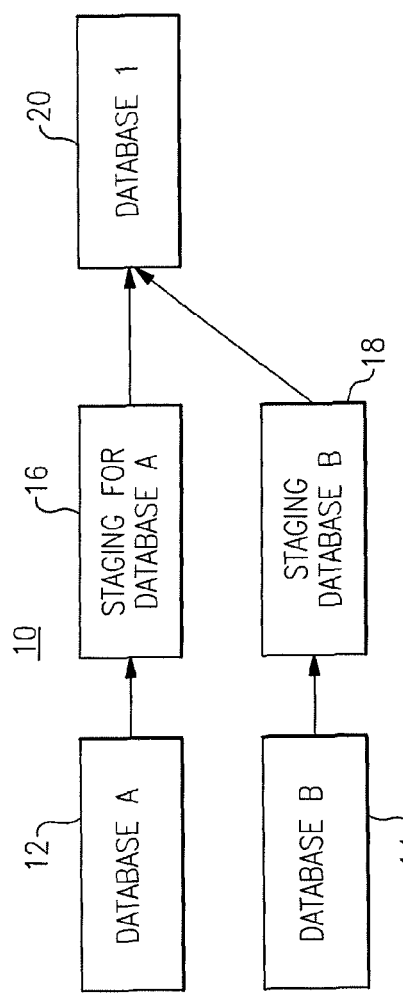
FIG. 1 is a schematic view of a prior art data migration system.
Figure 2:
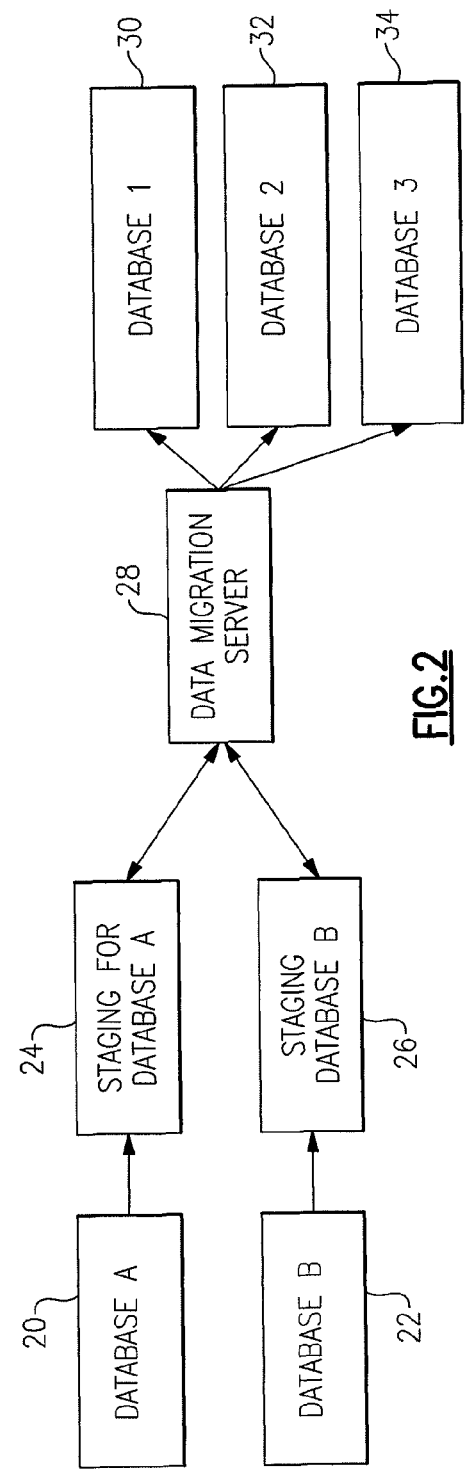
FIG. 2 is a schematic view of the data migration system of the present invention.

As will be appreciated, the present invention provides an effective method for reducing energy consumption of certain types of computer systems. The data migration process is enhanced by using power consumption as a guiding factor in determining how data in the source database can be assigned real time to a destination database to maintain a desirable power consumption level. Reference is made to FIG. 2, which illustrates the method of the present invention. Database A at 20 and Database B at 22 are source databases containing data that may be moved to an alternate storage location. It should be mentioned that the method and system of the present invention may be used for i) data that must be moved and ii) data that may be moved or may stay in its current location. Migration is ultimately an economic decision that is based on the fixed cost of the migration versus the variable costs for an organization.

Data from Database A is sent to a Staging Server 24 and data from Database B is sent to a Staging Server 26 to test and check the data. The data migration server 28 looks at a number of databases and determines the best destination database to send the data from Database A and Database B. FIG. 2 shows three potential candidates for destination databases, Database 1 at 30, Database 2 at 32 and Database 3 at 34.

Data migration server 28 also handles the mapping of data from staging server 26 to the destination database. Scripts can be written to handle the migration process or existing database migration tools may be used to assist administrators in the migration process. Existing tools include a graphical user interface (GUI), which can interface with the data migration server 28.

In order to determine the best possible candidate for the destination database, the data migration server monitors the power consumption level of each destination database candidate. The monitoring may be accomplished by using an internal or external power meter device and other devices known for measuring power usage. In addition to monitoring power consumption, the data migration server executes migration policies and performs a predictive data migration decision-making process. Migration policies can include, but are not limited to, control of reference data, schema configurations, and merges of data.

Examples of types of databases useful herein as a destination database are set forth in Table 1 below. The parameters set forth in the Table are accessed in order to determine the best possible candidate for the destination database. The type of source data, the frequency of use of the source data, and the amount of source data to be moved are factors that are also taken into consideration when determining the best destination candidate for migration of data. For example, if the source data is not frequently accessed, the best candidate for the destination database may be Database 2 or 3, which use more power for each operation than Database 1 because the data will not be accessed on a regular basis. In comparison, if source data is frequently used, it may be more advantageous to move it to a database such as Database 1, which uses less power per operation.

Figure 3:
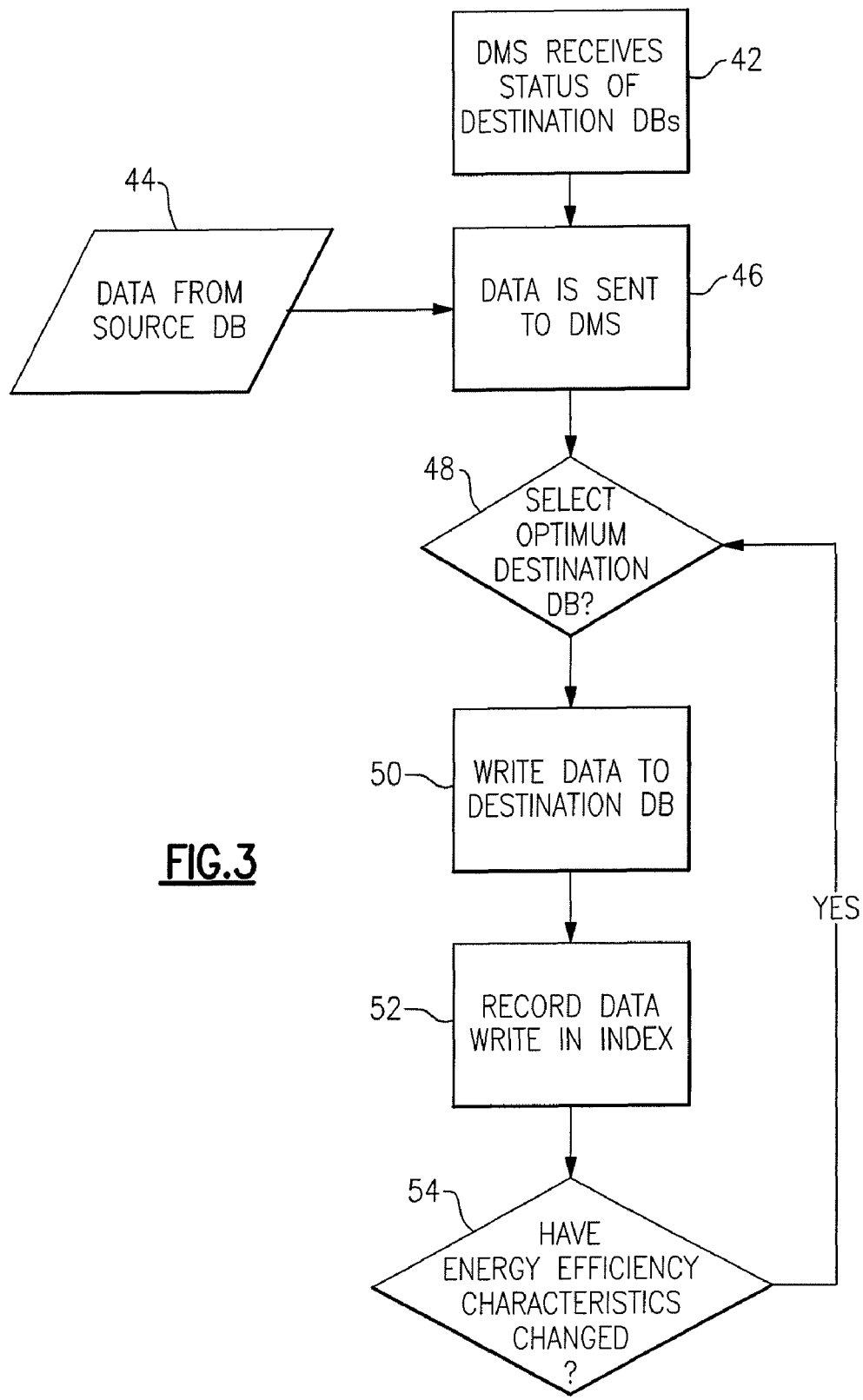
FIG. 3 is a flow chart showing the logic for the data migration system of the present invention.

Reference is made to FIG. 3, which shows the logic 40 used by the data migration server to determine the best candidate for the destination database. The first step involves polling for potential candidates for destination databases and/or receiving the status of potential candidates for destination databases as shown in step 42. Data migration server 28 maps the parameters of each of the candidates as set forth in Table 1 above. The data migration server 28 executes the migration task in accordance with the migration policy. For each migration task, source data is sent from the source database to the data migration server, as shown in steps 44 and 46. The data migration server 28 calculates the number of operations based on the transaction type and size of the source data. The data migration server 28 then compares the size of the source data and the number of operations of the write requests with potential destinations specified in the Destination Database Table. The data migration server 28 then determines which destination database is optimal for the source data and selects the destination database as shown in step 48. The data migration server writes data to the destination database in step 50 and records and maintains the data as shown in step 52. The data migration server continues to survey the destination databases after data has been migrated to a destination database to determine if energy efficiency characteristics have changed as set forth in step 54. If thrashing occurs, the data migration server must determine if the data should be relocated to a different destination database by repeating steps 48 through 54.

As mentioned above, the data migration server not only evaluates candidates for the destination database, but also must manage and assess the source data to determine when and where to move the data. Examples of source databases and parameters to be evaluated are set forth in Table 2, a User Intervention Policy Table. The source databases are reviewed by the data migration server.

TABLE 2

User Intervention Policy

| Database | Archive Status | Criticality of Data | Application Priority | Time |
|---|---|---|---|---|
| Database A | New | High | Payroll = High | Weekly |
| Database B | New | Low | HR = Medium | Daily |
| Database C | New | High | Finance = Low | Weekly |
| Database D | Archived | Medium | HR = Medium | Monthly |

In addition to the parameters set forth in Table 2, others may include the age of the data, the seasonality of the data and peak issues related to the data. Moreover, the values in Table 2 above are weighted to assist in further assessment of the data. Table 3 provides examples of weighted numbers to be applied to the parameters in Table 2.

TABLE 1

Destination Databases

| Data base | Location | Storage Type | Vendor/ Model | Space Available | Power (watt)/ operation | Power used so far (kilowatts) | Max. Power consumption limit (e.g. kilowatts per month) |
|---|---|---|---|---|---|---|---|
| 1 | Denver | NAS | Net Apps | 1,300 | 425 | 4000 | 10000 |
| 2 | San Jose | DASD | XYZ | 4,600 | 600 | 7000 | 8000 |
| 3 | Denver | Tape | ABC | 3,900 | 760 | 3500 | 6000 |

TABLE 3

User Intervention Policy Weighting Table

| Policy | Weight (must add to 1) |
|---|---|
| Archive Status | .20 |
| Criticality of Data | .40 |
| Application | .25 |
| Time | .15 |

The policies from the User Intervention Policy Table along with the weightings from the User Intervention Policy Weighting Table are then applied to the destination. The destination is updated as appropriate. For example, data that is less critical, older, and used less often by an application that is deemed of lower importance may be moved to a destination that is not as power efficient as a newer and more critical database used every day since a relatively idle storage device may use somewhat less power than a very busy one. Once the data migration server has selected the most efficient destination database according to the Destination Database Table for any given transaction, the power consumption can be predicted to reflect how much power has been used up to this point.

In circumstances where the data does not have to be moved, a determination can be made regarding potential cost savings. A calculation is provided to compute the "payback period," which is the time period that it will take to realize savings. The time period may be measured in minutes, hours, days, months, or years. The formula is as follows:

$$(T_0+E_0)x=M_i+E_i)x.$$

whereby x=the time period measured in months;

$T_0$=estimated total cost per month of ownership of the source database;

$E_0$=estimated cost per month of the energy consumption of the source database;

$M_i$=estimated cost of migrating the source data to the destination database;

$T_i$=estimated cost per month of ownership of the destination database; and $E_i$=estimated cost per month of the energy consumption of the destination database.

The following example illustrates the use of the formula.

Example

The current system's total cost of ownership of the source database is $10.00 per month. The energy consumption for the current system is $20.00 per month. The total cost of ownership of the destination database is $20.00 per month and the energy consumption for the destination database is $5.00 per month. The migration cost to move the data is $50.00. The amount of time that must be expended before savings can be realized is calculated as follows:

$$(10+20)x=50+(20+5)x$$

$$30x=50+25x$$

$$5x=50$$

$$x=10$$

Therefore, the "payback period" or the break-even point for migration in this example is ten months. Total costs are the same for ten months. Thereafter, savings will be realized.

Another embodiment of the invention is directed to a medium that is readable by a computer or other device, which includes an executable instruction for initializing data migration. In an aspect, the executable instruction involves the process steps 42-54 shown in FIG. 3, as described in detail above. In various aspects, the executable instruction may be in the form of a database utility application, a script-type program, a compiled program, or other suitable forms known in the art.

The term computer-readable medium as used herein refers to any medium that participates in providing an instruction to a computer processor for execution. Such a medium may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves, such as those generated during radio frequency (RF) and infrared (IR) data communications. Common forms of computer-readable media include, for example, a hard disc, any magnetic medium, a CD-ROM, CDRW, DVD, any other optical medium, optical mark sheets, and any other physical medium with patterns of holes or other optically recognizable indicia, a RAM, a PROM, an EPROM, a FLASH-EPROM, any other memory chip or cartridge, a carrier wave, or any other medium from which a computer can read.

The invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended embodiments.

What is claimed is:

1. A method for determining whether a data migration server should migrate source data from a source database to a destination database, wherein the source and destination databases carry out one or more transactions, comprising:

determining the average power consumption per transaction of the source database;

surveying with the data migration server a plurality of candidates for a destination database by monitoring the power consumption level of each of the plurality of candidates, wherein the step of monitoring the power consumption level comprises checking each of the plurality of candidates for i) available space; ii) power consumed up to the point of checking; and iii) maximum monthly power consumption limit;

comparing the average power consumption per transaction of the source database against the average power consumption per transaction of each candidate;

selecting a candidate from the plurality of destination database candidates that uses less power consumption per transaction than the source database;

moving the source data to the selected destination database; and surveying with the data migration server, after moving the source data to the selected destination database, the plurality of candidates for changes in the average power consumption per transaction of each candidate; and relocating the source data from the selected destination database to a second destination database if the second destination database uses less power consumption per transaction than the selected destination database.

2. The method of claim 1 wherein the monitoring step is performed periodically.

3. The method of claim 1 further comprising relocating the source data from the selected destination database to the second destination database if the power consumption increases past a preset threshold.

4. The method of claim 1 wherein the method of migrating source data from a source database to a destination database is carried out by the data migration server.

5. The method of claim 1 further comprising:
creating a user intervention policy comprising factors related to the source data to determine which source data should be migrated whereby the factors comprise one or more of: i) a list of one or more databases, ii) archive status of the one or more databases, iii) criticality of the one or more databases, iv) applications of the one or more databases, and v) scheduling of the one or more databases.

6. The method of claim 5 whereby weighted value is assigned to each of the factors to assist in determining which source data should be migrated.

7. The method of claim 6 wherein the source data is categorized into categories comprising one or more of: i) less critical, ii) more critical; iii) older, iv) recent, v) used infrequently, and vi) used every day; and whereby the less critical, older data that is used infrequently is moved to a database that has less power efficiency than the source database.

8. The method of claim 1 further comprising computing a payback period to determine the length of time as defined by x, measured by a predefined time period, required before the savings are realized comprising:
estimating the ownership cost per predefined time period of the source database defined as $T_0$;
estimating the energy consumption cost per predefined time period of the source database defined as $E_0$;
estimating the cost of migrating the source data to the destination database defined as $M_i$;
estimating the ownership cost per predefined time period of the destination database $T_i$;
estimating the energy consumption cost per predefined time period of the source database $E_i$;
whereby $(T_0+E_0)x=M_i+(T_i+E_i)x$.

9. The method of claim 8 wherein the predefined time period is measured in minutes, hours, days, months, or years.

10. A system for determining whether source data should be migrated from one or more source databases to a destination database comprising:
one or more source databases;
a plurality of destination databases;
one or more staging databases;
a data migration server;
whereby the data migration server determines whether the one or more source databases should be moved to one or more of the plurality of destination databases based on power consumption parameters, selects one of the destination databases for the migration of the source data thereto by i) monitoring the power consumption level of the plurality of destination databases by checking each of the plurality of candidates for available space, power consumed up to the point of checking, and maximum monthly power consumption limit; ii) comparing the power consumption level of each of the plurality of destination databases; and iii) selecting the destination database that uses the least amount of power per transaction,
moves the source data to the selected destination database,
continues to survey the plurality of candidates for changes in the average power consumption per transaction of each candidate; and
relocates the source data from the selected destination database to a second destination database if the second destination database uses less power consumption per transaction than the selected destination database.

11. The system of claim 10 wherein the data migration server creates a user intervention policy comprising factors related to the source data to determine which source data should be migrated whereby the factors comprise i) a list of one or more source databases, ii) archive status of the one or more source databases, iii) criticality of the one or more source databases, iv) applications of the one or more source databases, and v) scheduling of the one or more source databases.

12. The system of claim 11 whereby a weighted value is assigned to each of the factors to assist in determining which source data should be migrated.

13. The system of claim 12 wherein the data migration server computes a payback period to determine the length of time as defined by x, measured by a predefined time period, required to pass before savings are realized from the migration of data to the destination database, by using formula $(T_0+E_0)x=M_i+(T_i+E_i)x$, whereby
$T_0$=estimated total cost per predefined time period of ownership of the source database;
$E_0$=estimated cost per predefined time period of the energy consumption of the source database;
$M_i$=estimated cost of migrating the source data to the destination database;
$T_i$=estimated cost per predefined time period of ownership of the destination database; and
$E_i$=estimated cost per predefined time period of the energy consumption of the destination database.

14. The system of claim 13 wherein the predefined time period is measured in minutes, hours, days, months, or years.

15. A computer program product encoded in a non-transitory computer readable storage medium for instructing a migration data server to determine whether source data from a source database should be moved to a destination database, wherein the source and destination databases carry out one or more transactions, comprising:
instructing the migration data server to determine the average power consumption per transaction of the source database;
instructing the migration data server to survey a plurality of candidates for a destination database by evaluating the average power consumption per transaction of each candidate, wherein the migration data server evaluates the average power consumption per transaction of each candidate comprises checking each of the plurality of candidates for i) available space; ii) power consumed; and iii) maximum monthly power consumption limit;
instructing the migration data server to compare the average power consumption per transaction of the source database against the average power consumption per transaction of each candidate;
instructing the migration data server to determine if the average power per transaction of the source database is greater than the average power consumption per transaction of any of the plurality of candidates;

instructing the migration data server to select the destination database that uses less power consumption per transaction than the source database;

instructing the migration data server to move the source data to the selected destination database;

instructing the migration data server to survey, after moving the source data to the selected destination database, the plurality of candidates for changes in the average power consumption per transaction of each candidate; and instructing the migration data server to relocate the source data from the selected destination database to a second destination database if the second destination database uses less power consumption per transaction than the selected destination database.

16. The computer program product of claim 15 further instructing the data migration server to compute a payback period to determine the length of time as defined by x, measured in a predefined time period, required to pass before savings are realized from the migration of data to the destination database, by using formula $(T_0+E_0)x=M_i+(T_i+E_i)x$, whereby $T_0$=estimated total cost per predefined time period of ownership of the source database;

$E_0$=estimated cost per predefined time period of the energy consumption of the source database;

$M_i$=estimated cost of migrating the source data to the destination database;

$T_i$=estimated cost per predefined time period of ownership of the destination database; and $E_i$=estimated cost per predefined time period of the energy consumption of the destination database.

17. The system of claim 16 wherein the predefined time period is measured in minutes, hours, days, months, or years.

* * * * *